UNITED STATES PATENT OFFICE.

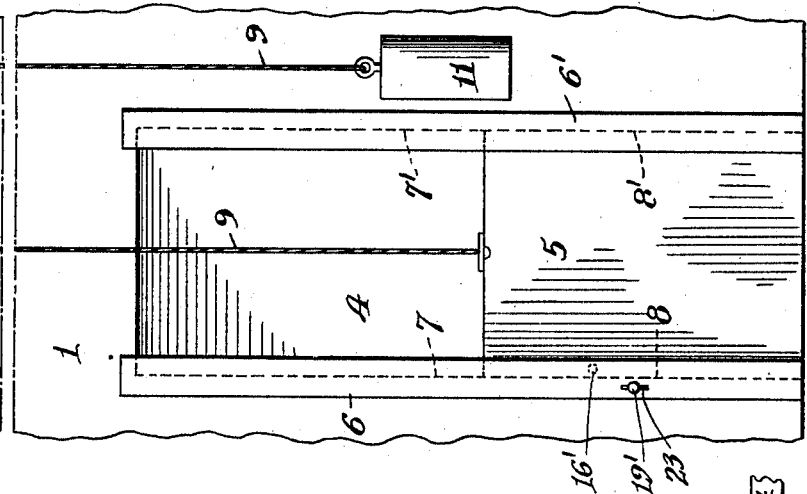

PAUL KUBEIN, OF ATCO, NEW JERSEY.

POULTRY-HOUSE.

982,435.  Specification of Letters Patent.  Patented Jan. 24, 1911.

Application filed August 31, 1910. Serial No. 579,869.

*To all whom it may concern:*

Be it known that I, PAUL KUBEIN, a citizen of the United States, and a resident of Atco, in the county of Camden and State of New Jersey, have invented certain new and useful Improvements in Poultry - Houses, of which the following is a specification.

My invention relates to poultry houses, such as are equipped for housing chickens and other poultry, and the object of my improvements is to provide a device which is adapted to be operated by the poultry for opening the door of its house, and a further object being a pivoted lever for preventing a slidingly suspended door from opening the house and supporting a platform on which the poultry will step or alight when descending from the roost in the morning to cause the lever to release the door and to open the house to allow the poultry to escape.

With this and other objects in view, my invention consists in the construction, combination and the arrangement of parts, as will be hereinafter more fully described and claimed and illustrated in the accompanying drawing, it being understood that changes in form, size, shape and other minor details may be made within the scope of my claim without departing from the spirit or sacrificing any of the advantages of my invention.

In the accompanying drawing, Figure 1, is a sectional side elevation of my poultry house; Fig. 2, is a front elevation thereof, and Fig. 3, is a plan view thereof.

Similar figures refer to similar parts throughout the several views.

A door 5, is free to slide vertically in a recess 4, of the wall 1, along grooves 7, 7', guided by strips 6, 6', covering its edges 8, 8'. The door is suspended from a rope 9, passing over pulley 10, 10, and carrying a weight 11.

Inside the house 2, near the opening 3, of the wall, is mounted brackets 12, 12, on which is pivoted a lever 13, provided with a vertical arm 14 and with a horizontal arm 15. The arm 14, is provided with a bracket 16, on which is pivoted a plunger 16', and with a bracket 19, on which is pivoted a rod 19'. The plunger 16', is passed through a hole 18, under the strip 6, and the rod 19' passes through a hole 20 and its projection 22, is provided with a slot 21, for a pin 23.

On the arm 15, is mounted a wooden platform or step 24.

The door 5, is provided with a socket 25, so that when the door is pulled down until the opening 3 is closed, the socket is directly in front of the plunger, and the weight of the arm 14 causes the lever to swing and forces the plunger within the socket and holds the door down over the opening. When a chicken alights or jumps on the platform, its weight causes the lever to swing and the arm 14 pulls the plunger out of the socket. The door is then free to be moved by the weight 11, and it slides up past the opening and the chickens are free to escape.

It will be understood that the door is shut at night after the fowls have gone into the house, but in the morning the door is automatically opened by the fowls as soon as they leave their roosts and jump or alight on the platform or step, which is natural for them to do.

Whenever it should become necessary to prevent the chickens from opening the door, a pin is slipped in the slot of the rod, which has the effect of locking the plunger in the socket.

Having thus described my invention, what I claim as new and desire to protect by Letters Patent, is—

In a chicken house, a wall provided with an opening and recessed around said opening, strips mounted on the wall forming vertical grooves with the recess on each side of the opening, a door for closing the opening suspended from a rope and free to slide in the grooves and along the recess, said door having a socket which is in alinement with a hole through the recessed portion of the wall when the door covers the opening, a lever inside the house pivoted on a bracket mounted on the wall and provided with a vertical arm and with a horizontal arm, a plunger pivoted on the vertical arm and passing through the hole of the recessed portion of the wall to plunge into the socket when the door is pulled down to cover the opening, a platform mounted on the horizontal arm to receive a weight for causing the vertical arm to pull the plunger out of the socket, a weight suspended from the rope for causing the door to uncover the opening when the plunger is out of the socket and a rod extending through the door frame pivoted on the vertical arm and provided with a slot for a pin to prevent the plunger from being withdrawn from the
5 socket, substantially as described and for the purposes set forth.

In testimony whereof I have signed this specification, in the presence of two subscribing witnesses.

PAUL KUBEIN.

Witnesses:
 ADAM R. SLOAN,
 LUCY SLOAN.